Nov. 5, 1968  G. JANTZEN  3,409,263
TIEDOWN DEVICE
Filed Sept. 9, 1966
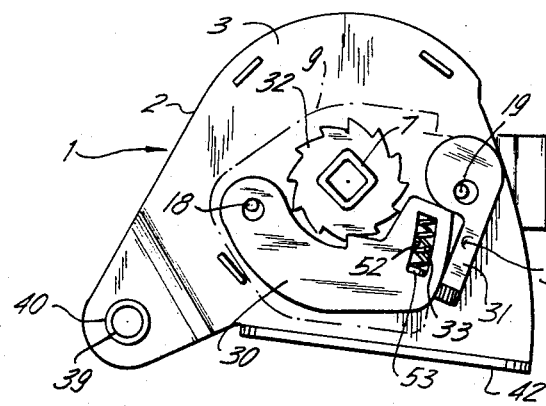
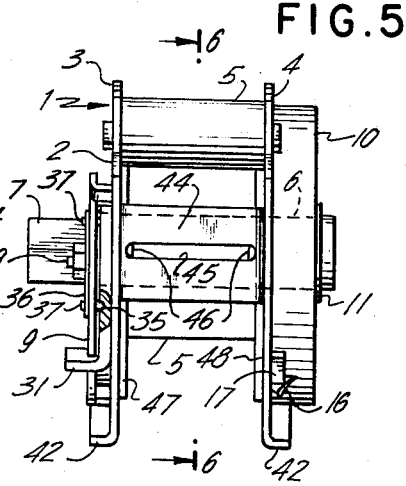
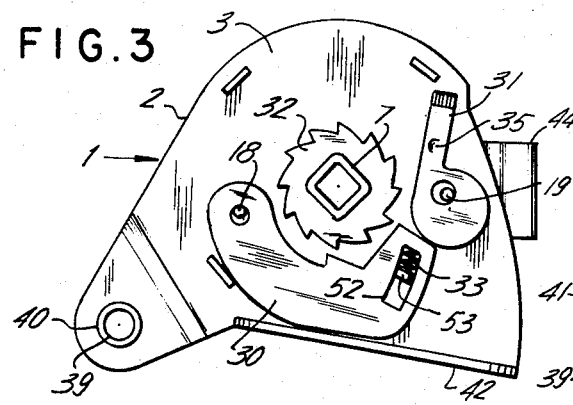
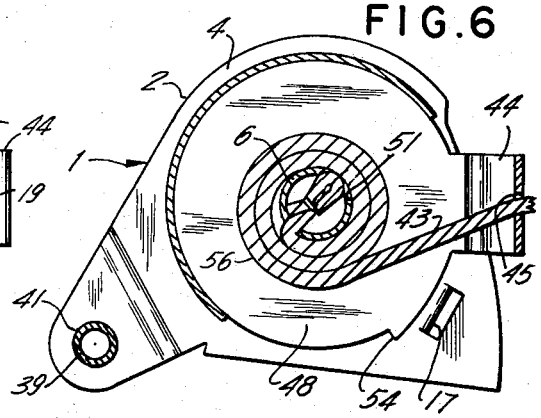
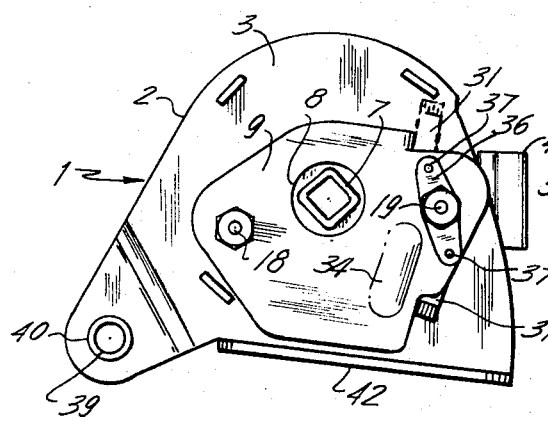
INVENTOR.
GEORGE JANTZEN
BY
ATTORNEY United States Patent Office 3,409,263
Patented Nov. 5, 1968

3,409,263
TIEDOWN DEVICE
George Jantzen, New York, N.Y., assignor to M. Steinthal & Co. Inc., New York, N.Y., a corporation of New York
Filed Sept. 9, 1966, Ser. No. 578,209
8 Claims. (Cl. 248—361)

ABSTRACT OF THE DISCLOSURE

A shaft is spring biased to wind up a tiedown belt, through a rotatable guide. A ratchet wheel is connected to the shaft and a pawl is connected to the body of the device to engage the ratchet to prevent rotation in the opposite direction. A cammed lever cooperates with a cam follower portion of the pawl to disengage the pawl for retraction or extraction of the belt from the shaft. The lever is held by a spring pin in the disengaging position and its ratchet engaging portion is between its pivot axis and its cam follower portion.

This invention relates to cargo control devices and more particularly to devices used in conjunction with flexible belts for holding loads in position during transit.

In transporting goods whether by rail, truck, air, it is often advantageous and indeed sometimes necessary to secure or tie down the goods to prevent their being damaged by shifting. Often tie down devices enable the fullest and hence the most economical arrangement of the goods within the vehicle. Sometimes of course, some form of flexible tie down arrangement is indispensable since there may be no other way of transporting the goods due to their nature.

In the art today, a number of hardware devices are available for fixing a flexible tie down means such as a nylon belt at one end and tensioning the belt at its other end to secure a load intermediate to the ends. Failings common to all of these devices and ones which discourage using them except where their use is indispensable, relate to the extreme inconvenience and difficulties in operating and releasing the belt tensioning mechanism, and in gathering and stowing the loose belt material when it is not in use.

This invention solves these problems by providing in a single unit, a combination belt tensioning and retracting device. In it, the belt tensioning mechanism is simple, rugged and easily accessible for operating. A simple and convenient located finger lever is operable to switch the mode of the device from tensioning to extraction-retraction. In retraction, the belt is guided onto the take-up shaft of the device, its full length being taken up and stored and immediately accessible for further use.

Accordingly, it is an object of this invention to provide a tensioning and retracting device for flexible tiedown means.

It is another object of this invention to provide a simple and rugged device for tensioning and holding in tension cargo tiedown belts and straps.

A further object of this invention is for providing a belt take-up mechanism which automatically takes up and stores so much of the belt as is excess to its use.

Another object of this invention is to provide a rugged receiving device which operates automatically to take up and store the full length of an extended tiedown belt.

A further object of this invention is to provide a belt tensioning device which can be most readily switched back and forth between tensioning and extraction modes to facilitate the optimum flexibility and convenience in its use, particularly in arranging the belt with respect to the load it is to secure.

These objective goals are accomplished by a combination belt tensioning and retracting device comprising a body assembly and a take-up shaft held in the body assembly. The belt is attached to the shaft and the shaft is biased to rotate and take the belt up onto it by a spiral spring fixed at one end to the shaft and at its other end to the spring housing. A pawl and ratchet wheel mechanism are positioned over one side plate of the body assembly and cooperate to tension the belt when the shaft is turned by a separate removable crank connected to one end of the shaft. And a cammed finger-lever is mounted to move the pawl into and out of engagement with the ratchet wheel for tensioning and extraction-retraction respectively. Spring biased members cooperate with an indent in the finger lever to hold the device in the tensioning or extraction-retraction positions. The belt is guided to center on the shaft and is prevented from twisting as it retracts by a slotted guide through which the belt passes and by guide surfaces on the guide, is fully pivotable into alignment with the angle at which the belt approaches the device.

The above described objects and features of this invention, and others, will be amply clear from the following detailed specification with reference to the following drawings in which:

FIGURE 1 is a side view of the device with the finger lever shown in the tensioning position and in phantom in the extraction-retraction position.

FIGURE 2 is a view of the device from the bottom with a portion of one seating surface cut away.

FIGURE 3 is a side view of the device with the cover removed and the device set in the extraction-retraction mode of operation.

FIGURE 4 is a side view of the device with the cover removed and shown in phantom and the device set in the tensioning mode of operation.

FIGURE 5 is an end view of the device with a portion of the cover plate cut away.

FIGURE 6 is a sectional view taken along the section lines 6—6 in FIGURE 5.

Referring to FIGURES 1, 2 and 6, a combination belt tensioning and retracting device is shown generally at 1.

The device is comprised of a body assembly 2 which consists of side plates 3 and 4 joined together by a cover 5. Extending through the side plate 3 is a shaft 6 being formed into a tensioning lug 7 at one end, which extends through hole 8 in a cover plate 9. The lug 7 provides means on the shaft 6 for coupling with a source of rotation; in this case, a hand crank, not shown. Behind the cover plate 9 are the operating portions of the device which will be herein after described. A spring housing 10 is fixed against the side plate 4 by snap ring 11 which snap locks within a groove on shaft 6. Wound about the shaft 6 within the spring housing 10 are the turns of a spiral spring (not shown) one end 12 of which is hooked into a slot 13 in the housing 10 and the other end of which is hooked into a slot 15 in the shaft 6. The spring housing 10 may be rotated to adjust the bias of the spring to the desired initial setting, which generally will be a bias sufficient to hold the belt 43 would upon the shaft 6 when the belt 43 is fully retracted. With the snap ring 11 in place, the spring housing 10 is kept from rotating by lug 16 which is formed on the rim of the spring housing 10 and encounters tab 17 on the side plate 4. The flexible tiedown means, such as the belt 43, is secured to the shaft 6 by being overlapped and stitched and threaded through a wide slot 51 and a narrow slot 55 in the shaft 6.

Referring to FIGURES 1, 3 and 4, the cover plate 9 is retained on the side plate 3 by studs 18 and 19 and their mating nuts. These studs also serve as the pivot points for the pawl 30 and the cammed lever 31. The pawl 30 is arranged to engage the teeth of ratchet wheel 32 which is fixed to the shaft 6 close to the face of the side plate 3. The pawl 30 is biased to engage the ratchet wheel 32 by the urging of spring 33. The spring 33 fits within the recess 34 in the cover plate 9 and the slightly curved slot 52 in pawl 30. The slot 52 is curved to correspond to the arc of rotation of the pawl 30. One end of spring 33 contacts the end of slot 52. The other end of spring 33 contacts the lug 53 which extends from the side plate 3 into the slot 52. Cammed lever 31 is pivotable to operate the pawl 30 into and out of engagement with the ratchet wheel 32. Cammed level 31 has an indent 35 on its face. This indent 35 cooperates with spring member 36 having pin members 37, conical and smooth at their ends, which extend through holes (not shown) in the cover plate 9. The cooperation of the members 37 and the indent 35 serve to hold the cammed lever 31 in a tensioning position, in which the pawl 30 is biased into engagement with the ratchet wheel 32, and in an extraction-retraction position in which the pawl 30 is held out of engagement with the ratchet wheel 32 by the cammed surface of lever 31.

Spacer 39 is inserted into holes 40 and 41 in side plates 3 and 4. The device 1 is held in place through the spacer 39. The surfaces 42 are also for seating the device 1 in place.

Referring to FIGURES 2, 5 and 6, the belt 43 passes off the shaft 6 through the slotted aperture 45 in the guide 44. Guide surfaces 46 serve to direct the belt 43 to center properly on the shaft 6. The guide 44 is pivotably supported on the shaft 6 by disks 47 and 48, which are spaced apart and also serve as walls for the belt 43. The guide 44 is free to pivot into alignment with the direction of the belt 43 to the limits allowed by its stops 54 and the cover 5. The belt 43 is prevented from twisting as it is retracted onto the shaft 6 by the slotted aperture 45 and is directed to center on the shaft 6 by the guide surfaces 46 disposed adjacent to the belt between the slotted apertured guide portion 45 and the shaft 6. These guide surfaces 46 are formed by a pair of aligned ribs 46.

In operation the device functions as follows: With the finger lever 31 pivoted into the extraction-retraction position, as shown in FIGURE 3, the pawl 30 is maintained out of engagement with the teeth of ratchet wheel 32. In this position, the flexible tiedown means, such as the belt 43, can be pulled easily from the device, winding up the spiral spring in spring housing 10 as it does. The belt 43 is arranged about a load and is secured at its free end to a fixed member. Little slack is retained in the belt since the belt is constantly under retraction bias. Thereupon, the operator pivots the cammed lever 31 to its tensioning position, as shown in FIGURES 4 and 5. The indent 35 and one of the pin members 37 cooperate to hold the lever 31 in this position. In this position, the pawl 30 is engaged with ratchet wheel 32. The operator, using a separate crank as the source of rotation which couples with the tensioning lug 7, cranks the shaft 6 to tension the belt 43 to hold its load securely. In this position, the pawl 30 holds the shaft 6 from rotating in the opposite direction and the belt 43 remains taut and holds its load securely.

To loosen the belt or to remove the belt from the load entirely, the operator merely pivots the lever 31 to the extraction-retraction position. Again the indent 35 and the other pin member 37 cooperate to hold the lever 31 in this position. When the free end of the belt is released, the belt 43 will automatically retract onto the shaft 6 through the guide 44.

The belt 43 can be tightened and loosened repeatedly merely by pivoting the finger lever 31 between the extraction-retraction and the tensioning positions and by cranking the shaft lug 7. When the belt 43 is no longer desired for use, the operator can retract the full length of the belt 43 and stow it conveniently in the device 1, by rotating the lever 31 to the extraction-retraction position and releasing the free end of the belt. The device 1 operates automatically to take up the full length of the belt 43.

The specific embodiment described above is one preferred embodiment in which this invention is used. It is to be understood that there is no intention to limit the scope of this invention by the specifics of the embodiment shown.

What is claimed is:

1. A cargo tiedown device comprising a body, a shaft rotatable in said body, flexible tiedown means for winding about said shaft, means on said shaft for coupling to a source for rotation, spring means for biasing said shaft in one direction, a ratchet wheel connected to said shaft, a pawl pivotably connected to said body having a portion adapted for engagement with said ratchet wheel and a cam follower portion, bias means for urging said pawl into engagement with said ratchet wheel to prevent rotation of said shaft opposite said one direction, lever means pivotably connected to said body and pivotable between a tensioning position and an extraction-retraction position, said lever means having a cammed surface thereon operably contacting said cam follower portion of said pawl and arranged to actuate said pawl out of engagement with said ratchet wheel when said lever is pivoted from said tensioning position to said extraction-retraction position and means for holding said lever means in said extraction-retraction position.

2. A device in accordance with claim 1 comprising guide means rotatably mounted to said shaft, said guide means having an apertured guide portion for receiving said flexible tiedown means therethrough and guide surfaces positioned between said apertured guide portion and said shaft and disposed adjacent said flexible tiedown means for directing said tiedown means onto said shaft.

3. A device in accordance with claim 2 in which said guide means comprises a pair of spaced support members rotatably mounted on said shaft, said apertured guide portion being positioned between said support members and said guide surfaces being formed by a pair of aligned ribs.

4. A device in accordance with claim 2 in which said guide means is mounted to said shaft by a pair of spaced rotatable disks disposed about said flexible tiedown means and forming walls therefor.

5. A device in accordance with claim 1 in which said lever means has an indent thereon and said body has a cover member positioned substantially over said lever means, said cover member having a pair of holes therethrough positioned to align respectively with said indent when said lever means is pivoted to said tensioning and said extraction-retraction positions, and spring means connected to said body and having a pair of pin members thereon, said members passing through respective ones of said holes for engagement with said indent when said lever means is pivoted to said positions.

6. A cargo tiedown device comprising a body, a shaft rotatable in said body, flexible tiedown means for winding about said shaft, means in said shaft for coupling to a source for rotation, spring means for biasing said shaft in one direction, a ratchet wheel connected to said shaft, a pawl pivotably connected to said body having a portion adapted for engagement with said ratchet wheel and a cam follower portion, said ratchet engaging portion being positioned between the pivot axis of said pawl and said cam follower portion, bias means for urging said pawl into engagement with said ratchet wheel to prevent rotation of said shaft in opposite direction, lever means pivotably connected to said body and pivotable between a tensioning position and an extraction-retraction position, said lever means having a cammed surface thereon operably contacting said cam follower portion of said pawl and arranged to actuate said pawl out of engagement with said ratchet wheel when said lever is pivoted from said tensioning position to said extraction-retraction position.

7. A device in accordance with claim 6 in which said lever means has an indent thereon and a pair of movable members are attached to said body and biased for engagement with said indent to hold said lever means in said tensioning and extraction-retraction positions when said lever is pivoted to said positions.

8. A device in accordance with claim 6 in which said pawl has a slot therein between said ratchet engaging portion and said cam follower portion and said means for urging said pawl into cooperative engagement with said ratchet wheel comprises a compression spring positioned within said slot and contacting at one end said pawl and at its other end said body.

References Cited

UNITED STATES PATENTS

| | | |
|---|---|---|
| 1,261,666 | 4/1918 | Wingert. |
| 2,449,600 | 9/1948 | Geiger _____ 248—361 |
| 3,109,628 | 11/1963 | Eells _____ 254—164 XR |
| 3,120,375 | 2/1964 | Haynes _____ 248—361 XR |

ROY D. FRAZIER, *Primary Examiner.*

J. F. FOSS, *Assistant Examiner.*